(12) United States Patent
Oyman et al.

(10) Patent No.: US 9,706,443 B2
(45) Date of Patent: Jul. 11, 2017

(54) DELIVERY OF TARGETED MEDIA CONTENT

(71) Applicant: INTEL IP CORPORATION, Santa Clara, CA (US)

(72) Inventors: Ozgur Oyman, San Jose, CA (US); Muthaiah Venkatachalam, Beaverton, OR (US); Eric Siow, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 240 days.

(21) Appl. No.: 14/487,349

(22) Filed: Sep. 16, 2014

(65) Prior Publication Data

US 2015/0081851 A1    Mar. 19, 2015

Related U.S. Application Data

(60) Provisional application No. 61/898,425, filed on Oct. 31, 2013, provisional application No. 61/879,014, filed on Sep. 17, 2013.

(51) Int. Cl.
    *G06F 15/16*      (2006.01)
    *H04W 36/00*     (2009.01)
    (Continued)

(52) U.S. Cl.
     CPC ......... *H04W 36/0016* (2013.01); *H04L 65/60* (2013.01); *H04N 7/147* (2013.01);
    (Continued)

(58) Field of Classification Search
     CPC ............... H04L 65/60; G06Q 30/0269; G06Q 30/0251; H04W 36/0016; H04W 36/0055; H04W 74/0833; H04N 7/147
See application file for complete search history.

(56) References Cited

U.S. PATENT DOCUMENTS 8,806,050 B2 *   8/2014   Chen ..................... H04L 65/607
                                                    709/227
2006/0120223 A1 *   6/2006   Seo ........................ G11B 19/02
                                                  369/30.01

(Continued)

FOREIGN PATENT DOCUMENTS

KR    10-2010-012171 A    12/2010

OTHER PUBLICATIONS

3GPP Universal Mobile Telecommunications System (UMTS); LTE Multimedia Broadcast/Mul't icast Service (MBMS); Protocols and codecs ETSI TS 126 346 V11.5.0 (Jul. 2013) European Telecommunications Standards Institute 2013 Jul. 2013.*

(Continued)

*Primary Examiner* — John Macilwinen
(74) *Attorney, Agent, or Firm* — Thorpe North & Western

(57) ABSTRACT

Technology for receiving targeted media content is disclosed. A user equipment (UE) can receive a first metadata including group information for files corresponding to targeted media content and media presentation description (MPD) information associated with the files, wherein each file the group information is associated with a group identification (ID) element. A second metadata can be received in a user service description (USD) that includes MPD information for streaming media content. A user profile can be identified that includes group ID elements associated with a user. Targeted MPD information for selected targeted media content having the group ID element that is included in the user profile can be inserted into the MPD information for the streaming media content to generate a merged MPD. The selected targeted media content and the streaming media content can be received according to the merged MPD for playback at the UE.

20 Claims, 11 Drawing Sheets

(51) Int. Cl.
  *H04W 74/08* (2009.01)
  *H04L 29/06* (2006.01)
  *H04N 7/14* (2006.01)
  *G06Q 30/02* (2012.01)

(52) U.S. Cl.
  CPC ... *H04W 36/0055* (2013.01); *H04W 74/0833* (2013.01); *G06Q 30/0251* (2013.01); *G06Q 30/0269* (2013.01)

(56) References Cited

U.S. PATENT DOCUMENTS

| | | | | |
|---|---|---|---|---|
| 2009/0007171 | A1* | 1/2009 | Casey | G06Q 30/02 725/34 |
| 2011/0307581 | A1* | 12/2011 | Furbeck | H04L 65/1083 709/219 |
| 2013/0111520 | A1* | 5/2013 | Lo | H04L 67/306 725/35 |
| 2014/0013375 | A1* | 1/2014 | Giladi | H04L 67/108 725/112 |
| 2014/0372624 | A1* | 12/2014 | Wang | H04L 65/60 709/231 |

OTHER PUBLICATIONS

Yue Zhang; Screen Real Estate Ownership Based Mechanism for Negotiating Advertisement Display; University of Saskatchewan Saskatoon; Oct. 2009; 81 pages.

3GPP TS 26.247: Transparent end-to-end packet switched streaming service (PSS); Progressive download and dynamic adaptive streaming over HTTP (3GP-DASH); 113 pages; V11.3.0 (Jun. 2013).

3GPP TS 26.346: Multimedia Broadcast/ Multicast Service (MBMS); Protocols and codecs; 168 pages; V11.5.0 (Jun. 2013).

Pinto, et al. "Context-aware Multimedia Distribution to User Groups"; UBICOMM 2011: The Fifth International Conference on Mobile Ubiquitous Computing, Systems, Services and Technologies.

* cited by examiner

DELIVERY OF TARGETED MEDIA CONTENT

RELATED APPLICATIONS

This application claims the benefit of and hereby incorporates by reference U.S. Provisional Patent Application Ser. No. 61/898,425, filed Oct. 31, 2013, and U.S. Provisional Patent Application Ser. No. 61/879,014, filed Sep. 17, 2013.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
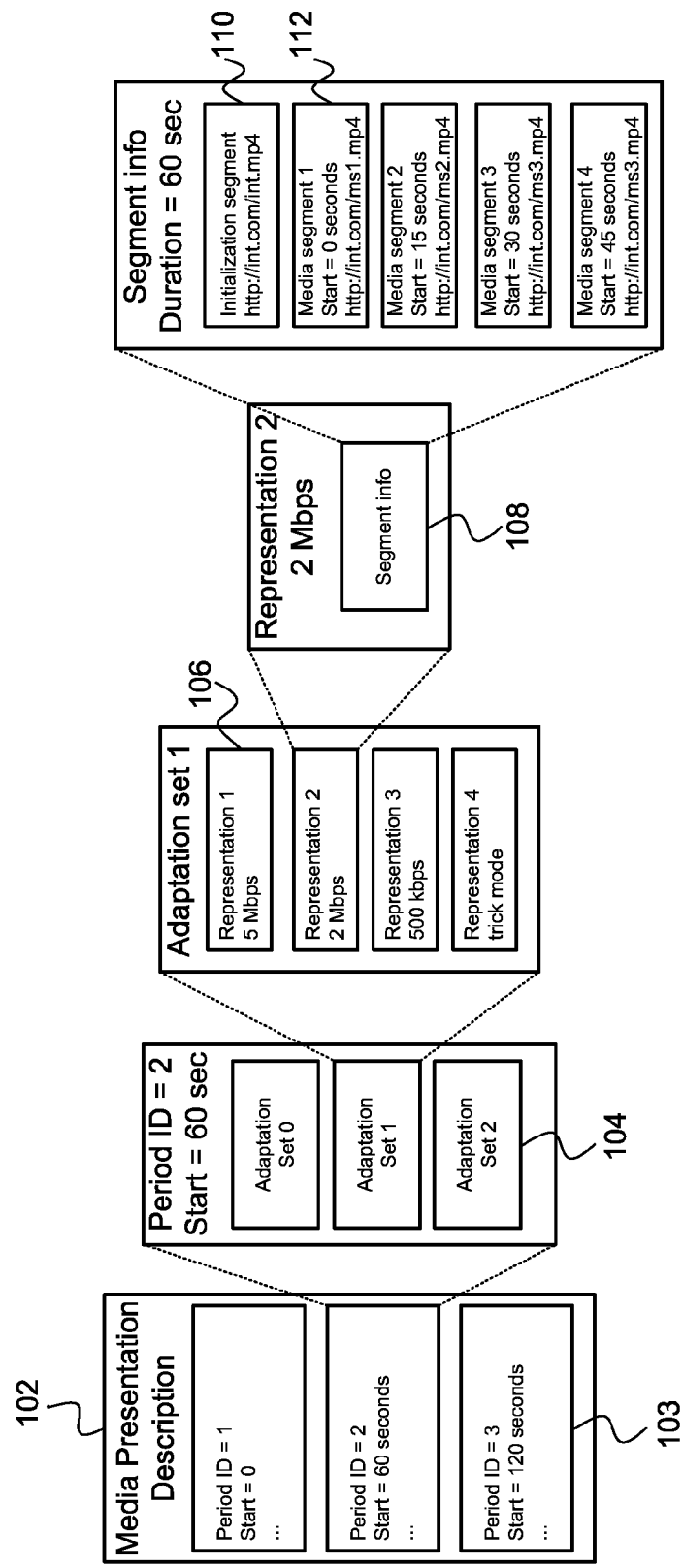
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for receiving targeted media content in a broadcast environment, at a multimedia broadcast multicast service (MBMS) client of a user equipment (UE), and playing the targeted media content in a media content stream for consumption at the UE. The MBMS client can receive a user service description (USD) from a server (e.g., an advertisement server) containing media presentation description (MPD) information that describes targeted media content (e.g., files or sessions of targeted media content). The targeted media content can include advertisements. For example, the USD can include a group identification (ID) element for the various files and sessions of the targeted media content. The group ID element can be a descriptor for the various files and sessions of the targeted media content. For example, the group ID element can identify the targeted media content items as being related to cars, movies, electronics, etc. In addition, the MBMS client can receive USD that includes MPD information for streaming media content, such as live video or a television (TV) broadcast (e.g., a news broadcast, a soccer match). The streaming media content can be received from a broadcast multicast service center (BMSC). The MBMS client can listen to a broadcast channel and determine to cache certain targeted media content items (e.g., advertisements) based on the group ID elements associated with the targeted media content items and a user profile associated with the UE. The user profile can include a description of the viewing habits and/or demographical information of a user of the UE. In other words, the user profile can identify types of targeted media content that interest the user of the UE.

The MBMS client can cache the targeted media content items having group ID elements that correspond with the interests defined in the user profile. The MBMS client can insert MPD information for the cached targeted media content items into the MPD information associated with the streaming media content in order to create a merged MPD. The merged MPD can describe the segments to be fetched for both the streaming media content and the targeted media content. The streaming media content and the targeted media content can be received at the UE according to the merged MPD. A dynamic adaptive streaming over HTTP (DASH) client of the UE can perform playback using the streaming media content and the targeted media content. In one example, the targeted media content items can be played at predefined placeholders while the streaming media content is being provided. As an example, the streaming media content can periodically include an empty 30-second slot, in which the targeted media content item is played via the DASH client of the UE.

Hypertext transfer protocol (HTTP) adaptive streaming (HAS) can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

When using HAS to deliver internet multimedia content, a video client operating on a mobile device can be configured to perform the primary role in rate adaptation by choosing and requesting the appropriate video representation levels from a video server using an HTTP GET or partial GET command to retrieve data from a specified resource, such as a multimedia server. The video client initially builds up a buffer to a certain level before beginning to playback streaming multimedia content, such as audio or video. This phase is referred to as the start-up phase. After this, the client begins playback of the buffered multimedia content. The quality and resolution of the multimedia playback at the client device is dependent on the available link bandwidth. The video client typically estimates the available link bandwidth based only on higher layer throughput estimates, such as HTTP-level video streaming throughput, or on transmission control protocol (TCP) throughput.

Multimedia streaming in a high mobility environment can be challenging when fluctuations in network conditions (i.e., network variability) decreases a communication data rate associated with the multimedia content. When an overloaded network causes the communication data rate to decrease, an end user quality of experience (QoE) can decrease as well. For example, the multimedia content received at the mobile device can be of less resolution or quality and/or the multimedia content can periodically break or pause when being provided over the overloaded network.

The use of progressive download based streaming techniques in mobile networks of limited resources can be undesirable due to inefficient bandwidth utilization and poor end user quality of experience. As discussed in further detail below, hyper-text transfer protocol (HTTP) based streaming services, such as dynamic adaptive streaming over HTTP (DASH), can be used to address weaknesses of progressive download based streaming.

Multimedia content that is streamed to a client, such as a user equipment (UE), can include a plurality of multimedia content segments. The multimedia content segments can each contain different encoded versions that represent different qualities levels of the multimedia content. The different encoded versions can allow the client to seamlessly adapt to changing network conditions. For example, when the network conditions are good (i.e., the network conditions are above a predetermined threshold), the client can request multimedia content segments that are of a higher video quality. When the network conditions are poor (i.e., the network conditions are below a predetermined threshold), the client can request multimedia content segments that are of a lower video quality. As a result, the client can still be able to receive the multimedia content segments (albeit at a lower quality) when the network conditions are poor and a likelihood of the adaptive media stream being interrupted can be reduced.

In DASH, the client can select the multimedia content segments with a highest bit rate, such that the multimedia content segments can be downloaded at the client in time for media playback without causing a rebuffering event in the media playback. In other words, the client may not select multimedia content segments that are so high that the adaptive media stream is periodically interrupted in order to cache or preload a portion of the media content onto the client before resuming media playback at the client. In one example, adverse network conditions can degrade a quality of the media content stream. The adverse network conditions can include coverage nulls, abrupt bandwidth changes, packet losses, substantial delay variations, etc. Although adaptive streaming techniques can consider current network conditions when calculating an available throughput and determining an appropriate streaming bit rate based on the available throughput, smooth media playback at the client may not be guaranteed during abrupt network variations and/or adverse network conditions.

Therefore, in order to maintain a desirable quality of experience for an adaptive media stream at the client, the client's planned route and current network conditions along the planned route can be used to strategically cache the multimedia content segments at the client, thereby resulting in smoother media playback and an enhanced quality of experience at the client. The client can select a planned route (i.e., a geographical route that the client is about to embark on). The client can be streaming media content (e.g., a movie) while traveling on the planned route. In one example, the client can include a mobile device located within a moving vehicle or a computing device of the vehicle. The client can receive current network conditions for the planned route from a channel information database (CID). The current network conditions can include certain locations along the planned route (e.g., tunnels, bridges, remote areas) with corresponding network conditions that are below a predetermined threshold. The client can request additional media content segments of the media content (e.g., additional segments of the movie) from a media content server and then store the additional media content segments in the cache. When the client reaches the locations along the planned route with network conditions that are below the predetermined threshold, the client can playback media content that is stored in the cache. As a result, continuous media playback can be substantially provided at the client, even during times when current network conditions along the planned route fall below the predetermined threshold.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and record video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards can be used to provide streaming video, conversational video, or video sharing.

Streaming Media Standards

A more detailed explanation of HTTP streaming, and more particularly, the DASH standard is provided herein, in context with embodiments of the present invention. The detailed explanation is not intended to be limiting. As will be further explained in the proceeding paragraphs, the embodiments of the present invention can be used to efficiently communicate multimedia to, from, and/or between mobile devices by enabling the mobile devices, or the servers in communication with the mobile devices, to select and/or communicate multimedia having a desired energy characterization. The multimedia can be communicated using a standardized or non-standardized communication scheme.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

DASH is a standardized HTTP streaming protocol. As illustrated in FIG. 1, DASH can specify different formats for a media presentation description (MPD) metadata file 102 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

Figure 2:
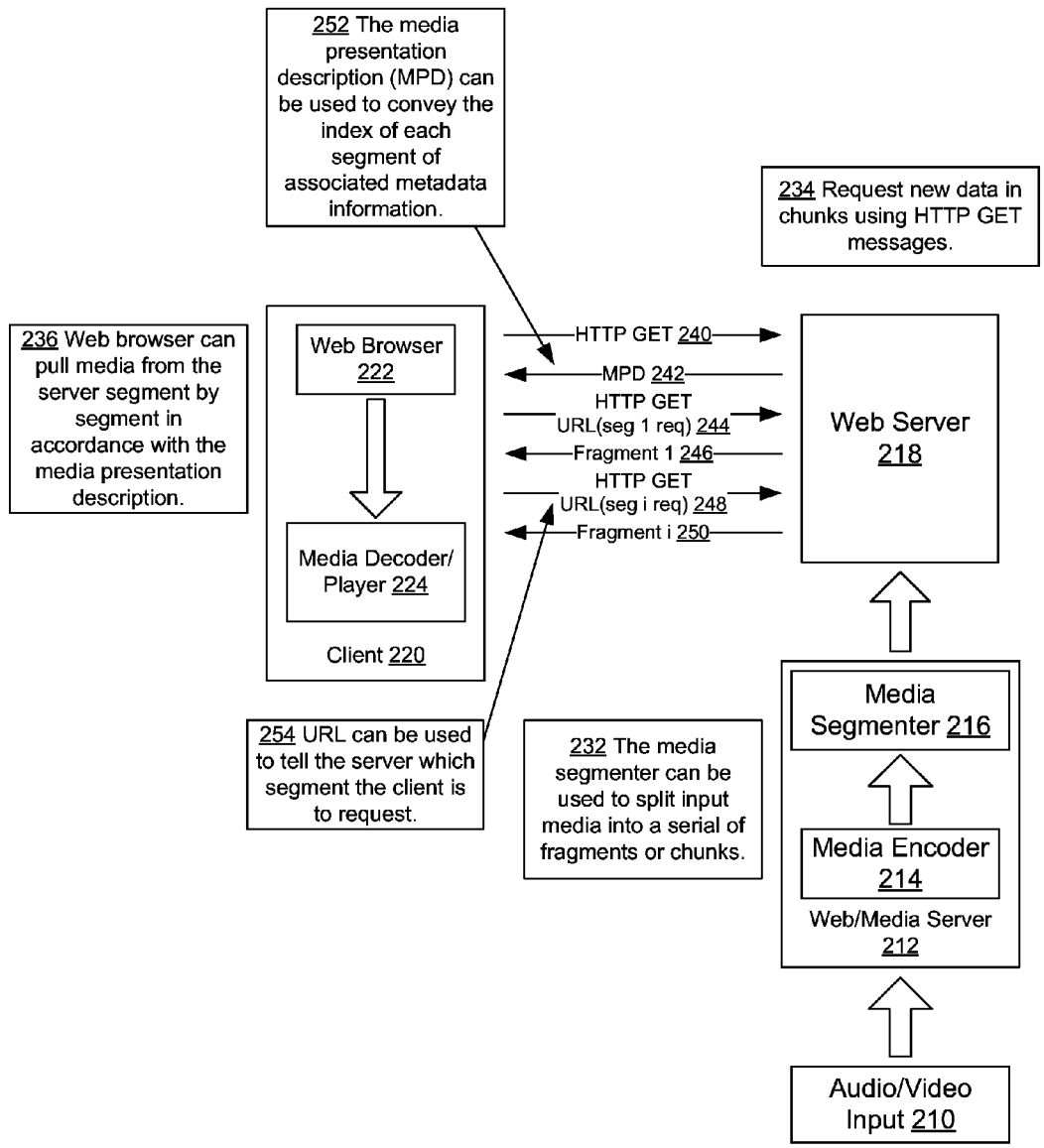
FIG. 2 illustrates a block diagram of hypertext transfer protocol (HTTP) streaming in accordance with an example.

In DASH, a media presentation description (MPD) metadata 102 can provide information on the structure and different versions of the media content representations stored in a web/media server 212, as illustrated in FIG. 2. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set can also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video can also be available in different formats, such as two dimensional (2D) or three dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs can be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, system requirements, potential types of interference, and so forth. The actual media segments or sub-segments can have a length that is less than one second to several minutes long.

As shown in FIG. 2, the MPD metadata information can be communicated to a client 220, such as a mobile device. A mobile device can be a wireless device configured to receive and display streaming media. In one embodiment, the mobile device can only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as managing an on-time request and smooth play-out of a sequence of segments, or potentially adjusting bitrates or other attributes, to react to changes of a wireless link, a device state or a user preference.

FIG. 2 illustrates a DASH-based streaming framework. A media encoder 214 in the web/media server 212 can encode an input media from an audio/video input 210 into a format for storage or streaming. A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first segment using a HTTP GET URL(frag 1 req) 244. A uniform resource locator (URL) or universal resource locator can be used to tell the web server which segments the client is to request 254. The web server can provide the first fragment (i.e., segment 1 246). For subsequent segments, the web browser can request a segment i using a HTTP GET URL(frag i req) 248, where i is an integer index of the segment. As a result, the web server can provide a segment i 250. The segments can be presented to the client via a media decoder/player 224.

Figure 3:
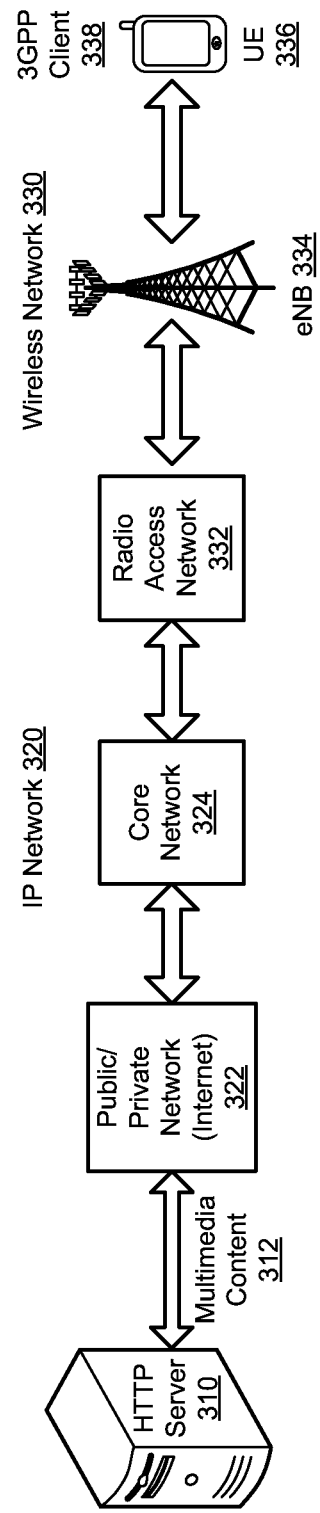
FIG. 3 illustrates a block diagram of an energy characterization-aware radio access network (RAN) architecture for hypertext transfer protocol-based (HTTP-based) video streaming in accordance with an example.

FIG. 3 illustrates a flow of multimedia content 312 between an HTTP server 310 providing the multimedia content to a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network or an IEEE 802.16 based network (i.e. 802.16-2009). The core network can access a wireless network 330, such as an evolved packet system (EPS) via a radio access network (RAN) 332. The RAN 332 can provide the multimedia content to the client operating on the UE 336 via a node (e.g., an evolved Node B (eNB) 334).

In one example, the HTTP server 310 can be coupled to a channel information database 350. The channel information database 350 can include current network conditions for a plurality of geographical locations. The plurality of geographical locations can include particular roads, streets, neighborhoods, geographical regions, bridges, tunnels, etc. The current network conditions can be based on real-time monitoring of the current network conditions for the plurality of geographical locations. Therefore, the channel information database 350 can be dynamically updated due to variations in the current network conditions. Alternatively, the current network conditions can be inferred based on historical network condition information for the plurality of geographical locations. In yet another example, the current network conditions can be determined using crowd sourced network condition information.

Enhanced Multimedia Broadcast Multicast Services (eMBMS)

The on-going commercialization of LTE networks has precipitated increasing interest in the deployment of enhanced multimedia broadcast and multicast services (eMBMS). The LTE version of Multimedia Broadcast Multicast Services (MBMS) is eMBMS. MBMS is a point-to-multipoint interface specification designed to provide efficient delivery of broadcast and multicast services. MBMS can be applicable to mobile television (TV) and radio broadcasting, as well as file delivery and emergency alerts. Since the first deployments of eMBMS are expected in 2014, it is important to enhance the performance and usability of the core MBMS user service features. MBMS, which is specified in 3GPP TS 26.346 Releases 6-12, is a point-to-multipoint system utilized on cellular networks operating in accordance with one of the cellular standards promulgated by the 3GPP. MBMS is designed for efficient delivery of popular media content to a plurality of receivers based on broadcast and multicast techniques. At the service layer, MBMS defines delivery protocols for both streaming of multimedia content and reliable download of files, based on the user datagram protocol (UDP) at the transport layer, and using real-time transmission protocol (RTP) for streaming and File Delivery over Unidirectional Transport (FLUTE) for file delivery.

An MBMS access client can receive the media data and metadata from the server, known as the broadcast multicast service center (BMSC), via user service discovery (USD) signaling. MBMS has been adopted as the evolved MBMS (eMBMS) mode in 3GPP-based Long Term Evolution (LTE) standards development corresponding to 3GPP Release 8 and onwards. The MBMS Download Delivery technique is designed to deliver an arbitrary number of objects via MBMS to a relatively large receiver population. MBMS Download defines several techniques to increase reliability such as FEC and file repair. The download delivery technique allows the delivery of DASH segments and Media Presentation Descriptions.

MBMS download delivery is an attractive service alternative for offloading HTTP-based unicast download delivery. Benefits include enabling support for new non-real-time service types, provision of contents that complement MBMS streaming services, and leveraging the increasing storage capacity on devices. The DASH segment format, although mainly intended for unicast transport with HTTP, is agnostic of the delivery environment being unicast or multicast. The MBMS User Service Specification TS 26.346 indicates the possibility for DASH-formatted content to be transmitted using MBMS download delivery with the FLUTE protocol. FLUTE, as defined in RFC3926, permits to deliver segments over MBMS such that the client observes them being delivered over HTTP/TCP. HTTP-URL is assigned to each delivered object in FLUTE and the HTTP-URL maps the Segment URLs in the MPD, i.e., the Content-Location element in the File Delivery Table (FDT) for the delivered object over FLUTE matches the Segment URL in the MPD. The UE can identify the received DASH representations based on the comparison of the HTTP URLs contained in the MPD and the URL information included in the FLUTE packets.

Figure 4:
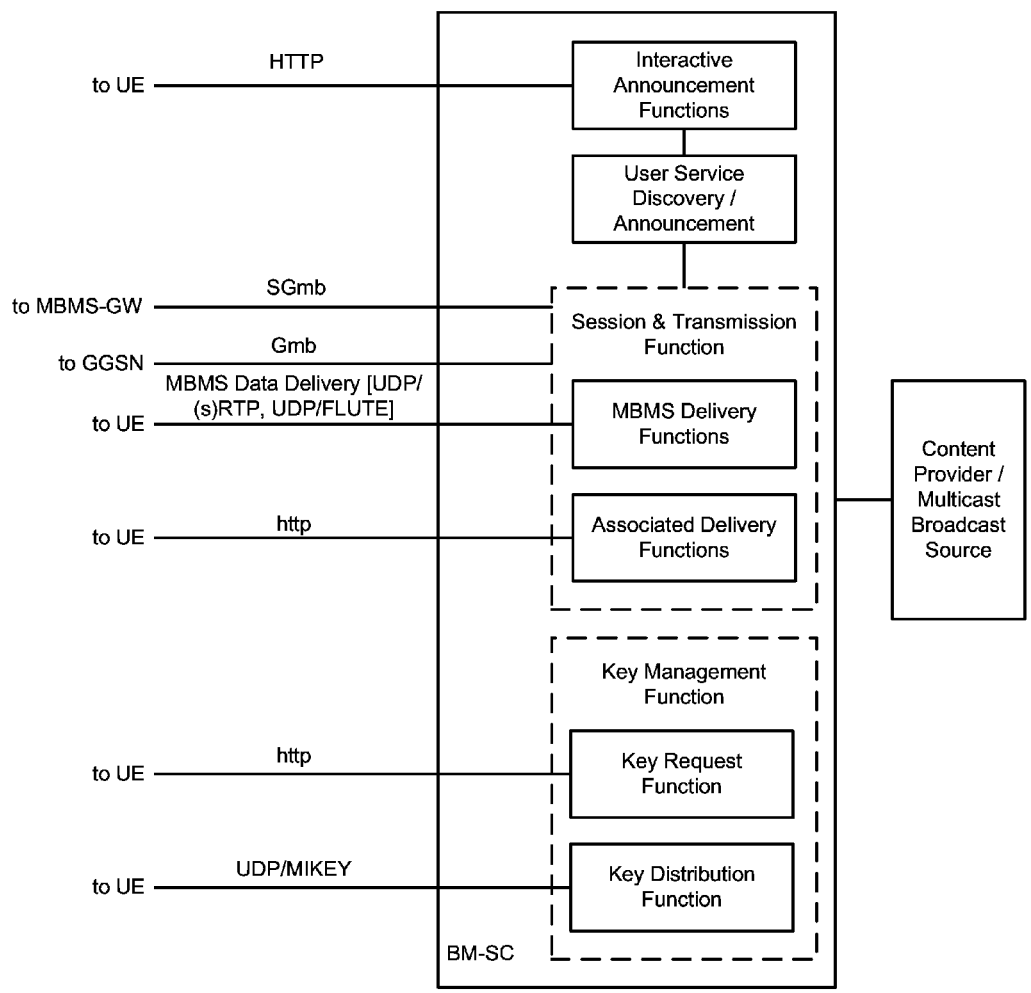
FIG. 4 illustrates a diagram of a broadcast multicast service center (BMSC) in accordance with an example.

FIG. 4 illustrates the MBMS-based broadcast multicast service center (BMSC) sub-functional architecture and associated interfaces between the UE and BMSC. The BMSC or BM-SC can be in communication with and/or control a content provider/multicast broadcast source. The BM-SC can provide the MBMS delivery functions. The MBMS is further described in 3GPP TS 26.346.

Figure 5:
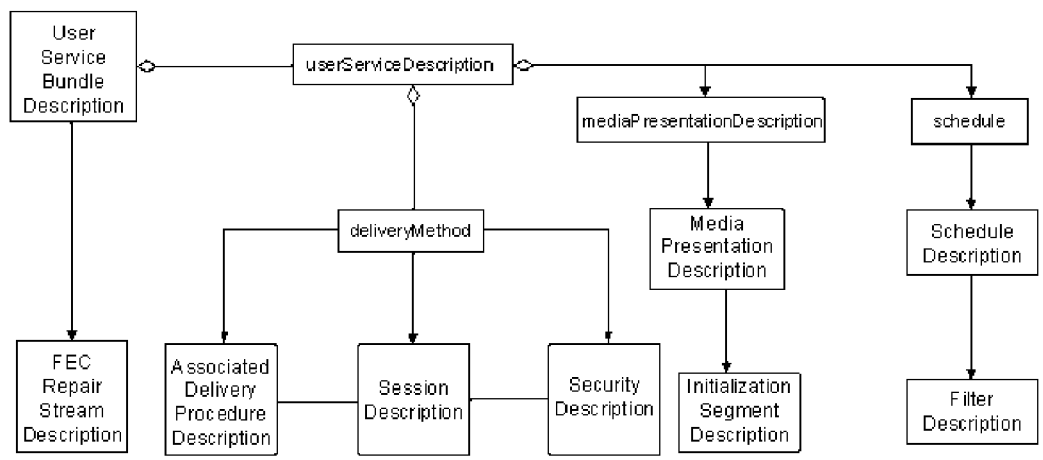
FIG. 5 illustrates a diagram of a multimedia broadcast and multicast services (MBMS) user service description (USD) in accordance with an example.

FIG. 5 illustrates a diagram of a multimedia broadcast and multicast services (MBMS) user service description (USD). The BM-SC announces available MBMS services via one or more instantiations of user service descriptions (USDs) organized as a service bundle. The MBMS User Services are described by metadata (objects/files) delivered using the download delivery method or using interactive announcement functions. MBMS User Service Discovery or Announcement involves the delivery of fragments of metadata to a plurality of receivers in a suitable manner. The metadata itself describes details of services. Metadata management information consists of metadata envelope object(s) (in XML format) allowing the identification, versioning, update and temporal validity of metadata fragment objects.

As shown in FIG. 5, the metadata included in the USD that are provided to the receivers can include: a metadata fragment object describing details of a single or a bundle of MBMS user services, a metadata fragment object(s) describing details of MBMS user service sessions, a metadata fragment object(s) describing details of Associated delivery methods, a metadata fragment object(s) describing details of service protection, a metadata fragment object describing details of the FEC repair data stream, a metadata fragment object providing a Media Presentation Description (for DASH content), a metadata fragment object(s) providing Initialisation Segments (for DASH content), a metadata fragment object(s) providing a Schedule information description, a metadata fragment objects(s) providing filtering data for an MBMS User Service within a service bundle at the level of individual sessions of a given user service or individual file contents within a user service The growth of video distribution services (e.g., streaming, download, broadcast, TV, etc.) has driven advertisers to better target users by personalized advertisements and increase the likelihood of viewing for their advertisements by the users and their relevance to the users' needs/interests (i.e., instead of being skipped or not watched). In broadcast networks such as those based on e-MBMS, from the point of view of advertisement insertion, the advertisements are typically inserted before broadcast and the advertisements are distributed via broadcast just like the main video content. This gives little opportunity to target ads to obtain a better return on investment, since all the users would be receiving the same advertisements and there is no room left for personalization. Therefore, as described in greater detail herein, the delivery of advertisements over e-MBMS can be personalized for the users.

In one configuration, personalized advertisements can be inserted live to a media content stream. For example, two major soccer teams of a populated city are to play a derby match against each other in the weekend. Since the game is expected to generate a lot of interest among the fans, an operator plans to offer the service over MBMS to its subscribers. The game content is to be broadcasted based on the FLUTE-based download delivery technique using the DASH format. The operator plans on delivering separate sets of targeted advertisements to the club fans, i.e., to be played back during the game breaks, etc., toward promoting the products from the fan stores of each soccer club. Since it is costly in terms of bandwidth to broadcast multiple event streams of main content with different advertisements pre-inserted at the server for each stream, the operator decides to broadcast a single main event stream along with a separate set of advertisements, leaving the advertisement insertion to be performed by the client. In other words, the client can insert the advertisements belonging to a certain set into predefined placeholders within the streaming media content, i.e., the single main event stream.

In another configuration, the personalized advertisements can be inserted from a cache into the media content stream. An operator can offer advertisement delivery service to its MBMS-capable subscribers, enabled by content caching capability in the UEs, which is currently available via memory/storage capabilities in mobile devices. The advertisement content can be based on the DASH file format. The MBMS client devices of the users subscribed to the service can join advertisement broadcast sessions, e.g., ideally scheduled during off-traffic or uncongested hours, and cache the advertisements relevant to the user preferences/interests. During a later live broadcast event, the user can watch one of these pre-cached advertisements instead of the advertisements in the main content stream. Beyond enabling advertisement personalization, this is especially desirable when poor network conditions are experienced by the client during the advertisement broadcasts within a live stream.

Therefore, personalized advertisement insertion can be supported in MBMS and eMBMS. The main broadcast content (i.e., the streaming media content) and targeted media content files (e.g., advertisements) can be broadcasted to the client separately, and the insertion of targeted media content files can be enabled at the client. With respect to live events, the delivery of personal advertisements to the clients can be scheduled toward timely insertion into the main broadcast content. The insertion of pre-cached advertisements can replace the advertisements in the main broadcast stream provided that these advertisements are authorized and satisfy certain criteria, e.g., the advertisements are fetched earlier from the operator network. In addition, the UE can selectively cache broadcasted advertisements based on classification information according to user preferences.

In one example, the MBMS client of the UE can listen to a broadcast channel for targeted media content. The targeted media content can be broadcasted from a broadcast multicast service center (BMSC). Each targeted media content item can be associated with a group identification (ID) element and/or a descriptor. The group ID element and/or the descriptor can identify a category associated with the targeted media content item. For example, a first group ID element can identify that a first targeted media content item is related to cars and a second group ID element can identify that a second targeted media content item is related to sports. Other examples of group ID elements can include social group, profession, ethnic group, etc. The targeted media content item that is tagged with the group ID element can be a media content file, or alternatively, the targeted media content item can be a media content session, wherein the media content session is a plurality of media content files.

In one example, the MBMS client can determine the group ID element for each targeted media content item that is broadcasted according to a user service description (USD). The MBMS client can receive the USD from the BMSC prior to the transmission of the targeted media content items, wherein the USD describes the targeted media content items to be broadcasted. The USD can include a group filter or group information containing group ID elements that describe the targeted media content items. The group filter or group information can be part of a filter description metadata fragment in the USD. In other words, the USD is similar to an electronic service guide. The USD can describe the broadcast channels, the targeted media content items to be delivered for each broadcast channel, a time at which each targeted media content item is to be delivered, a characterization (i.e., descriptor or group ID element) for each of the targeted media content items, etc. The group ID element can indicate that a particular targeted media content item is related to one of: cars, video games, music players, etc.

In another example, the USD can signal such classification/categorization information in particular elements of the USD. For example, the Schedule description element can include a fileSchedule element that contains the details on the broadcasted files (i.e., the targeted media content items). In addition, the descriptor on the classification and categorization information for the advertisements can be included in the fileSchedule element to distinguish among the contexts of the broadcasted advertisement files on a file-by-file basis, i.e., each broadcasted advertisement file can be associated with a descriptor on the category/class that the advertisement belongs to.

In addition, the MBMS client can maintain a database on the classification and categorization information regarding the types of targeted media content that the user is interested in. In other words, the MBMS client can maintain a user profile for each user of the UE that indicates the user's viewing habits and demographical information. As a non-limiting example, the user profile can indicate that the user likes advertisements related to sports, cars, and politics. In addition, the demographical information can identify a gender, an age, a geographical location, etc. associated with the user.

When the BMSC broadcasts the targeted media content files, the MBMS client can selectively cache targeted media content files that are of interest to a user of the UE (i.e., DASH segments for the advertisements). The MBMS client can look for the broadcasted files with descriptors (as indicated in the USD) matching the user's interests in the user profile. Similarly, the MBMS client can select a targeted media content file having a group ID element that matches with a group ID element contained in the user profile. In other words, the MBMS client can selectively receive content with group filter values known to match the user profile. In one example, the MBMS client can select a targeted media content session (i.e., a plurality of media content files) having a group ID element that corresponds with the user profile. The MBMS client can store the selected media content files in a cache, and at a later time, the MBMS client can play the media content files during a media content stream (e.g., a football game, a news broadcast) for consumption at the UE.

In one example, the user profile descriptor (i.e., the descriptor or the group ID element) on the classification and categorization information for a given session can be included in the sessionSchedule element in the USD, along with a set of start and stop times to distinguish among the contexts of the broadcasted content files in that session on a per time slot basis as dictated by the start and stop times, i.e., broadcasted content files at a given time interval can be associated with a user profile descriptor on the category/class that the targeted users belong to. In another example, the representation format of the targeted media content can be based on determination of a set of keywords describing the targeted media content. These determined context information keywords can be stored locally in a database maintained by the MBMS client, and are matched against the keywords representing the advertisement content. The targeted media content (e.g., advertisements) whose content description keywords have a match with the context information keywords are identified as the targeted media content to be inserted and presented to the user.

Since the targeted media content files are broadcasted, the MBMS client can be able to receive all of the broadcasted media content files. However, the MBMS client can parse a header of a targeted media content file and determine that the user of the UE is not interested in this category of targeted media content file. Therefore, the MBMS client can ignore the targeted media content files that do not correspond with the user profile. As a non-limiting example, the MBMS client of a UE can choose to ignore an advertisement with a group element ID indicating that the advertisement is for children action toys when the user profile associated with the UE indicates that the user is a 65 year old male.

In one example, the set of advertisement content can be broadcasted over a separate session to the MBMS clients. The advertisement content can be broadcasted prior to the main content broadcast, such as during off-traffic or uncongested hours. The advertisement content can be transmitted to the MBMS client together with metadata corresponding to a remote element that describes the advertisement content and metadata containing classification and categorization information on the advertisement (e.g., sports, music, cars, home appliances, computers, food, etc.). The classification and categorization information can include a group ID element or a descriptor that is attached to each advertisement with a certain uniform resource indicator (URI) and a value equaling to the context of the advertisement. In one example, a relatively large number of users can desire to receive and cache each class/category of advertisement in order to justify the delivery of the advertisements via broadcast.

At a later time, the MBMS client can receive streaming media content (e.g., a main content broadcast for a football game). The streaming media content can include live video or a television (TV) broadcast. The streaming media content can be broadcasted to a set of users. The streaming media content can contain predefined placeholders for targeted media content files (e.g., advertisements). For example, the MBMS client can know the streaming media content being received based on the USD. The MBMS client can have previously received the USD from the BMSC. The USD can describe the broadcast session and the broadcast content for all of the broadcast channels. In other words, the USD can describe the streaming media content, as well as the targeted media content files (e.g., the advertisements). Since the streaming media content can be DASH-formatted content, the MPD for the DASH-formatted content can be included in the USD. The MPD can be an extensible markup language (XML) file.

In order to play both the streaming media content and the targeted media content at the UE, an MPD can be created that identifies the segments associated with both the streaming media content and the targeted media content (e.g., the targeted media content stored in the cache of the UE) that relates to the user profile. In the MPD for the streaming media content, a period or placeholder can point to a remote element via XLINK, wherein the remote element includes information about the targeted media content file (e.g., the advertisement content). The remote element can be an element that is not fully contained in the MPD, but rather is referenced in the MPD with an HTTP-URL using a simplified profile of XLINK. In other words, in order to insert the targeted media content file into the streaming media content, XLINK can be used to refer to an external DASH segment or DASH scene in the MPD.

Within a first MPD for the streaming media content (e g., a first XML file), a second MPD for the targeted media content that relates to the user profile (i.e., a second XML file) can be referenced using XLINK. The remote elements from the second MPD can be inserted into the first MPD, thereby resulting in a larger MPD. In other words, two XML files can be merged to create the larger MPD. The usage here is for advertisement insertion because advertisements typically are communicated from different servers. The advertisements are managed separately from the streaming media content. In order to insert an advertisement into the streaming media content (e.g., an ongoing DASH stream), XLINK can be used to refer to external DASH segments for the advertisement. The second MPD associated with the external DASH segments (i.e., the MPD for the targeted media content) can get inserted and merged with the first MPD for the streaming media content in order to create the larger MPD or a merged MPD. The merged MPD can provide an overall content description for both the streaming media content and the targeted media content files (e.g., the advertisements that relate to the user profile). Therefore, the UE can use the merged MPD to play both the streaming media content and the targeted media content.

In one example, the DASH client of the UE can receive the MPD for the streaming media content from the MBMS client of the UE. The DASH client can fetch and play media content segments (related to the main content broadcast) according to the MPD for the streaming media content. When the DASH client finds an XLINK attribute in the MPD pointing to the remote element (e.g., the placeholder), the DASH client can request the remote element from the MBMS client of the UE. The MBMS client can select one of the cached remote elements (i.e., which describes the advertisement content) and provides the remote element to the DASH client. For example, the MBMS client can select one of the remote elements that correspond to the user profile. The DASH client can receive the remote element from the MBMS client, and then reassemble the remote element into the MPD for the streaming media content. In other words, the MPD can be reconstructed to include the MPD for the remote element (i.e., the MPD describing the targeted media content to be played along with the streaming media content). For example, an MPD associated with the remote element can become merged with the original MPD. The DASH client can start fetching the segments described by the remote element (i.e., the segments corresponding to the personalized advertisement) in accordance with the reconstructed MPD. The DASH client can fetch the segments from the cache of the MBMS client and provide the segments for display on the UE. Based on the reconstructed MPD, the DASH client can play both the streaming media content and the targeted media content.

Since different user profiles can be associated with different UEs, each MPD can be constructed differently depending on which advertisements correspond with the user profiles. For example, a first MBMS client in a first UE can receive an MPD describing DASH segments for an action movie that is being broadcasted. A second MBMS client in a second UE can receive the same MPD. In other words, both UEs can be receiving the broadcast of the action movie. However, a user profile associated with the first UE can indicate that the user likes car advertisements. Therefore, the first MBMS client can reconstruct the MPD, such that the remote elements referenced in the reconstructed MPD are related to car advertisements. On the other hand, a user profile associated with the second UE can indicate that the user likes children's toys. Therefore, the second MBMS client can reconstruct the MPD, such that the remote elements referenced in the reconstructed MPD are related to toy advertisements. Based on the user profile, users watching the same action movie (i.e., the main content stream) can receive different targeted media content files, e.g., the car advertisements or the toy advertisements. Each UE can seek different remote elements among the broadcasting remote elements (e.g., corresponding to the advertisements that are of interest to the user) and insert those remote elements into the UE's own construction of the MPD.

In one configuration, considering a live broadcast event setting, the main content stream and the advertisement streams can be simultaneously broadcasted to the MBMS client of the UE. In other words, in this configuration, the MBMS client may not receive the advertisements during off-traffic or an uncongested period before the main content stream is broadcasted. The advertisement streams can be associated with a relatively lower rate as compared to the main content stream because the advertisement streams are not immediately consumed at the UE. The MBMS client of the UE can cache the advertisements for timely insertion into the main content. The advertisements can be transmitted in parallel to the main stream, and the MBMS clients are expected to receive both. The BM-SC can schedule the main content transmission and delivery of the advertisements, such that the advertisements arrive in a timely fashion to be inserted into the main content. Since BM-SC controls the MPD updates where the XLINK-based remote elements pointing to the advertisements can appear, the BM-SC can ensure reception of the advertisements before updating the MPD with the XLINK-based remote element.

In one example, a remote element can be resolved when a DASH client receives one or more elements verbatim in a body of an HTTP response as a result of issuing an HTTP GET request to this URL. Attributes and elements obtained from the remote element can be added to the element of the MPD that contains @xlink:href and can be merged with the ones already present in the MPD. If the same attributes are present in both MPD and remote element, the attribute values can be the same. If they are not identical, then the value of the attribute of the MPD can take precedence over the value of the attribute in the remote DASH element.

Figure 6:
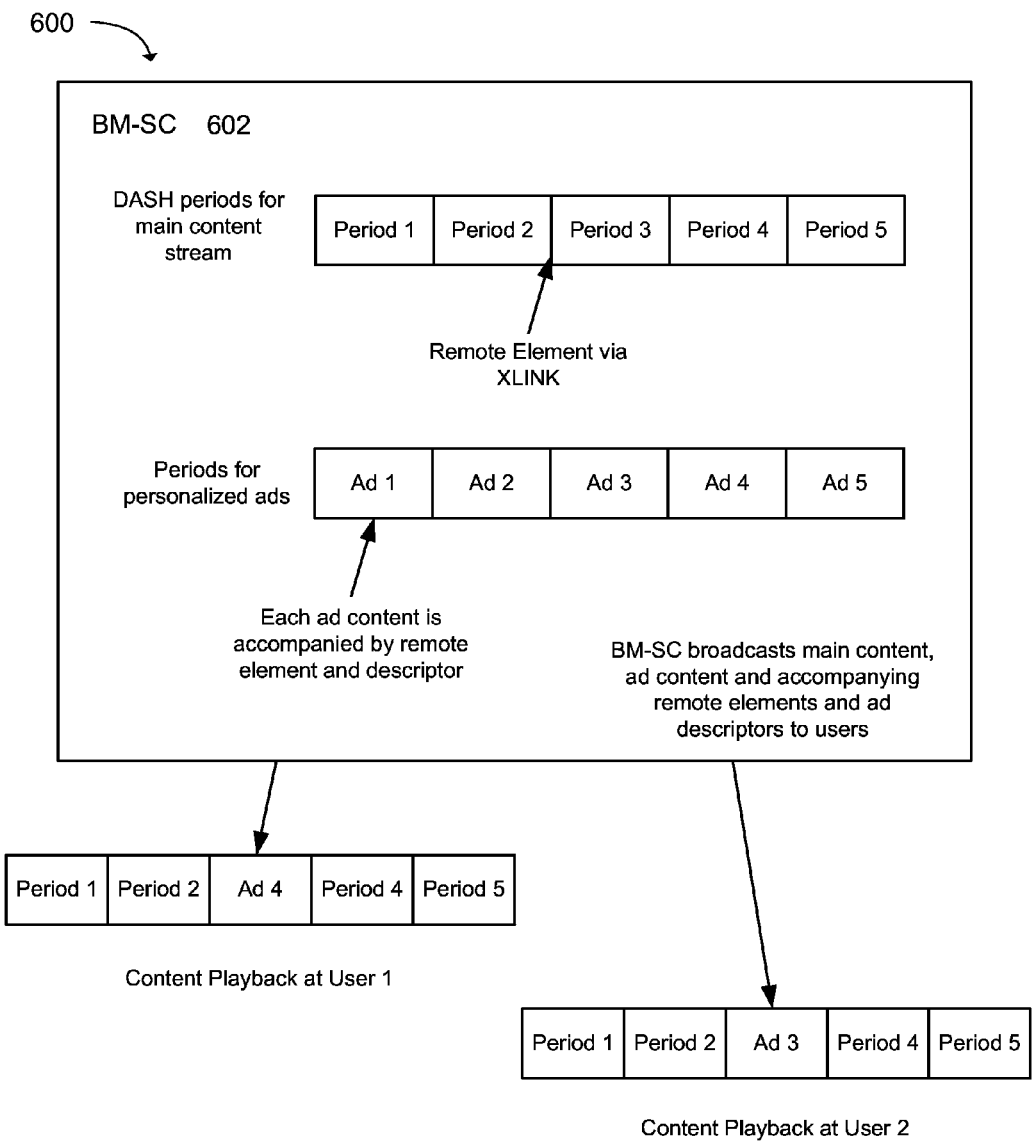
FIG. 6 is a diagram that illustrates the insertion of advertisements in a media content stream for a plurality of users in accordance with an example.

In one configuration, the operator can broadcast the advertisements in advance and each MBMS client can fetch and cache the advertisements of interest for later viewing, e.g., during a live broadcast event using DASH. Each broadcasted advertisement content is again accompanied by a remote element (for insertion into DASH content), as well as a descriptor metadata containing classification and categorization information on the advertisement content, so that the MBMS client can selectively receive and cache each advertisement content FIG. 6 is a diagram 600 that illustrates the insertion of advertisements in a media content stream for a plurality of users. A broadcast multicast service center (BMSC) 602 can broadcast a plurality of periods for a media content stream. For example, the main content stream can be divided into five periods of DASH content, i.e., period 1 to period 5. The periods in the main content stream can be described in a media presentation description (MPD). A multimedia broadcast and multicast services (MBMS) client of a user equipment (UE) can receive the media content stream from the BMSC 602 according to the MPD.

The MBMS client, either before or simultaneously with the media content stream, can listen to a broadcast channel for advertisements that are broadcasted from the MBSC 602. For example, the advertisements can include five separate advertisements, i.e., ad 1 to ad 5. Each advertisement can be accompanied by a remote element and a descriptor. The MBMS client, based on a user profile associated with a user of the UE, can determine which advertisements to receive and cache at the MBMS client. Therefore, the MBMS client can cache advertisements having a descriptor that corresponds with the user profile, and ignore advertisements having a descriptor that does not correspond with the user profile. Depending on the user profile, different MBMS clients can determine to cache different types of advertisements.

A DASH client of the UE can play the broadcasted main content, as well as the advertisements according to the MPD. As an example, the MPD can contain a remote element via XLINK between period 2 and period 3. The remote element can refer to the advertisement to be inserted between period 2 and period 3 during the media content stream. The DASH client can request the remote element from the MBMS client. In response, the MBMS client can provide a remote element that corresponds with the user profile to the DASH client. The DASH client can then retrieve the advertisement content associated with the remote element and play the advertisement content along with the media content stream. As a non-limiting example, a first DASH client can play period 1, period 2, ad 4, period 4 and period 5. A second DASH client can play period 1, period 2, ad 3, period 4 and period 5. Depending on the user profile, different DASH clients can play different types of advertisements.

Figure 7:
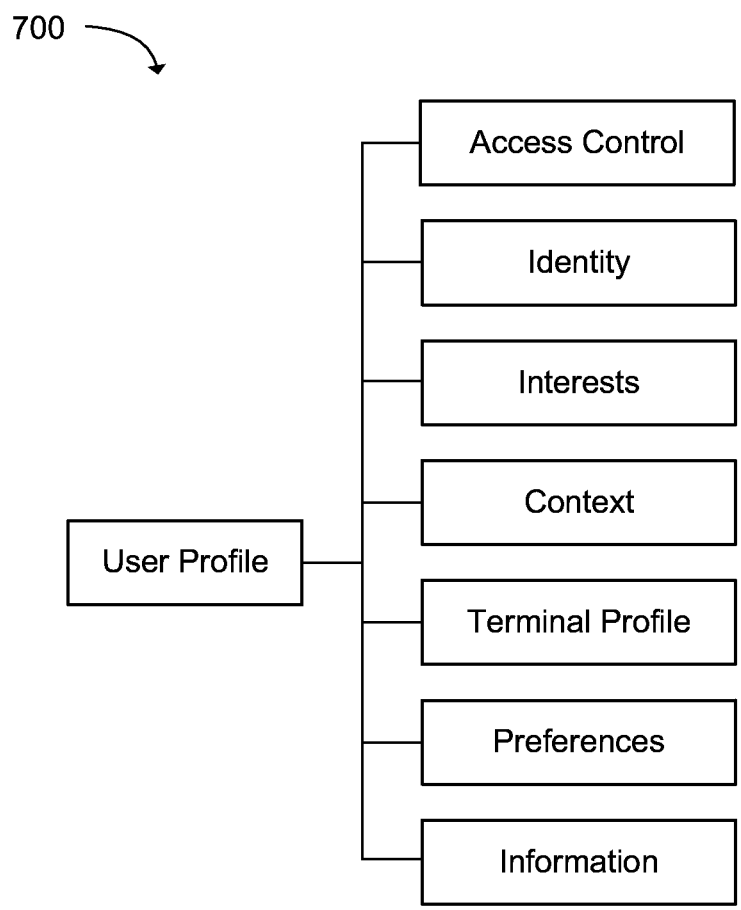
FIG. 7 depicts a diagram of a descriptor included in a multimedia broadcast and multicast services (MBMS) user service description (USD) in accordance with an example.

FIG. 7 is an exemplary descriptor 700 that can be included in a multimedia broadcast and multicast services (MBMS) user service description (USD). The descriptor can also be referred to as a user profile descriptor. The descriptor can be associated with targeted media content files that are broadcasted from a BMSC. The descriptor can describe a classification or categorization of a targeted media content file. For example, the descriptor can indicate that a certain targeted media content file is related to car advertisements or cell phone advertisements. The descriptor can be an XML structure that is inserted into the sessionSchdule element or fileSchedule element of the USD. The descriptor can include a plurality of fields, such as those relating to access control, identity, interests, context, terminal profile, preferences and information.

Figure 8:
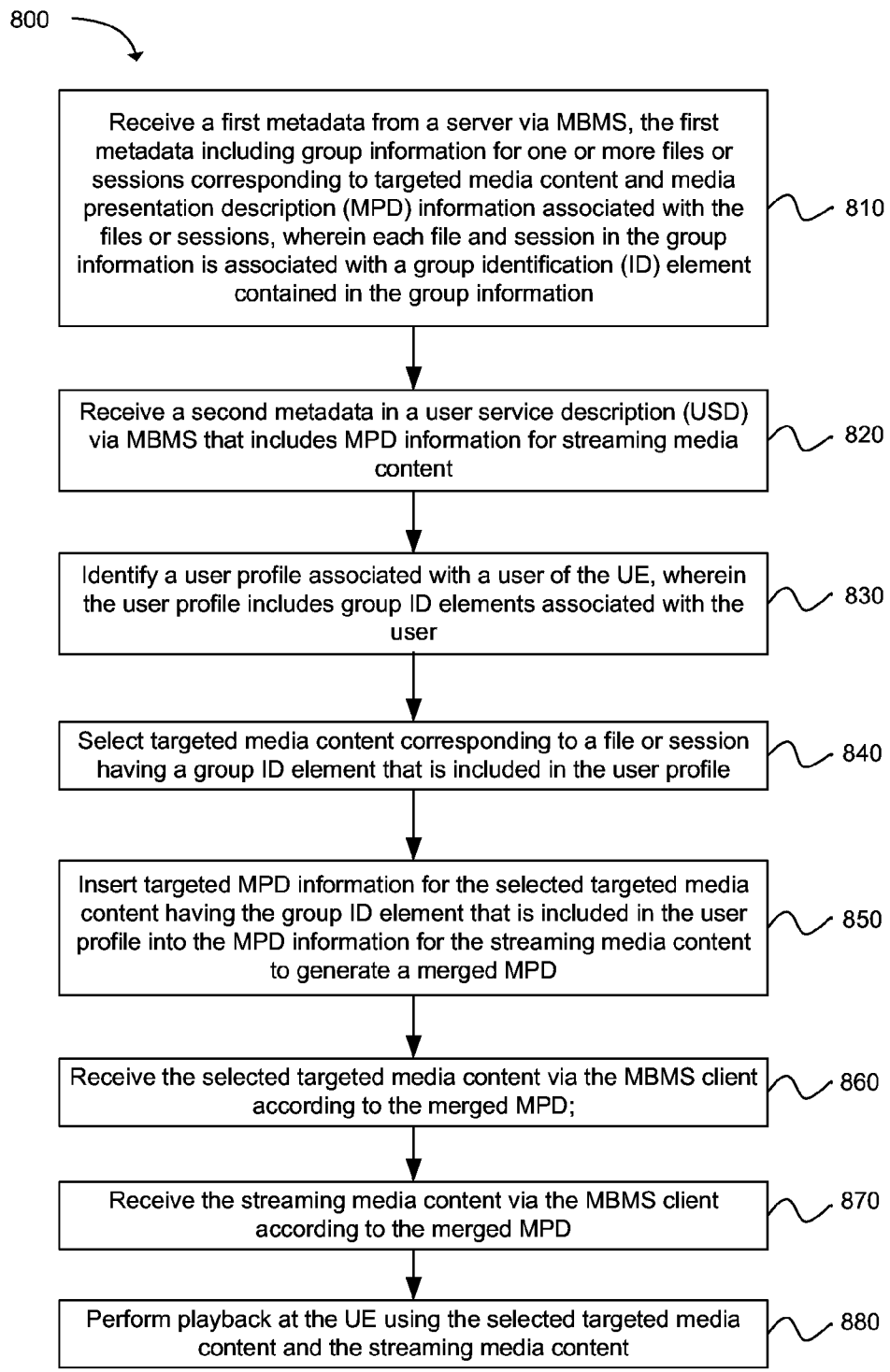
FIG. 8 depicts functionality of circuitry of a user equipment (UE) including a multimedia broadcast multicast service (MBMS) operable to receive targeted media content.

Another example provides functionality 800 of circuitry of a user equipment (UE) including a multimedia broadcast multicast service (MBMS) client operable to receive targeted media content, as shown in the flow chart in FIG. 8. The functionality can be implemented as a method or the functionality can be executed as instructions on a machine, where the instructions are included on at least one computer readable medium or one non-transitory machine readable storage medium. The circuitry can be configured to receive a first metadata from a server via MBMS, the first metadata including group information for one or more files or sessions corresponding to targeted media content and media presentation description (MPD) information associated with the files or sessions, wherein each file and session in the group information is associated with a group identification (ID) element contained in the group information, as in block 810. The circuitry can be configured to receive a second metadata in a user service description (USD) via MBMS that includes MPD information for streaming media content, as in block 820. The circuitry can be configured to identify a user profile associated with a user of the UE, wherein the user profile includes group ID elements associated with the user, as in block 830. The circuitry can be configured to select targeted media content corresponding to a file or session having a group ID element that is included in the user profile, as in block 840. The circuitry can be configured to insert targeted MPD information for the selected targeted media content having the group ID element that is included in the user profile into the MPD information for the streaming media content to generate a merged MPD, as in block 850. The circuitry can be configured to receive the selected targeted media content via the MBMS client according to the merged MPD, as in block 860. The circuitry can be configured to receive the streaming media content via the MBMS client according to the merged MPD, as in block 870. In addition, the circuitry can be configured to perform playback at the UE using the selected targeted media content and the streaming media content, as in block 880.

In one example, the targeted media content includes advertisements. In another example, the group ID elements associated with the user in the user profile relate to one of: viewing habits of the user or demographical information that describes the user. In yet another example, the circuitry can be further configured to: store the selected targeted media content received via the MBMS client in a cache at the UE; and perform playback at the UE using the selected targeted media content stored in the cache at the UE.

In one configuration, the circuitry can be further configured to receive the selected targeted media and the streaming media content from a broadcast multicast service center (BMSC). In another configuration, the circuitry can be further configured to receive the first metadata from an advertisement server via MBMS. In one example, the first metadata received from the server is included in an MBMS user service description (USD) that describes the targeted media content and the group ID elements that are associated with the targeted media content files. In another example, the UE includes an antenna, a touch sensitive display screen, a speaker, a microphone, a graphics processor, an application processor, internal memory, or a non-volatile memory port.

Figure 9:
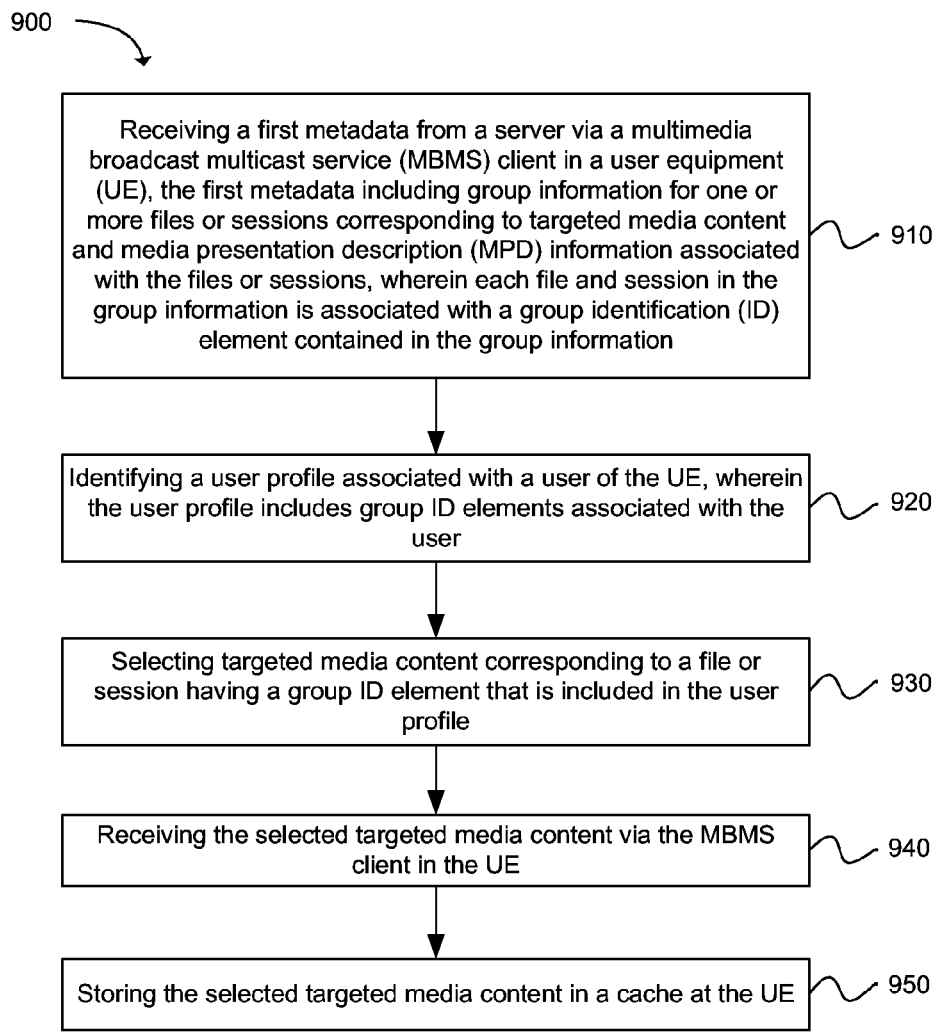
FIG. 9 depicts a flow chart of a method for receiving targeted media content in accordance with an example.

Another example provides a method 900 for receiving targeted media content, as shown in the flow chart in FIG. 9. The method can be executed as instructions on a machine, where the instructions are included on at least one computer readable medium or one non-transitory machine readable storage medium. The method can include the operation of receiving a first metadata from a server via a multimedia broadcast multicast service (MBMS) client in a user equipment (UE), the first metadata including group information for one or more files or sessions corresponding to targeted media content and media presentation description (MPD) information associated with the files or sessions, wherein each file and session in the group information is associated with a group identification (ID) element contained in the group information, as in block 910. The method can include identifying a user profile associated with a user of the UE, wherein the user profile includes group ID elements associated with the user, as in block 920. The method can include selecting targeted media content corresponding to a file or session having a group ID element that is included in the user profile, as in block 930. The method can include receiving the selected targeted media content via the MBMS client in the UE, as in block 940. In addition, the method can include storing the selected targeted media content in a cache at the UE, as in block 950.

In one configuration, the method can include: receiving a second metadata in a user service description (USD) via MBMS that includes MPD information for streaming media content; inserting targeted MPD information for the selected targeted media content having the group ID element that is included in the user profile into the MPD information for the streaming media content to generate a merged MPD; receiving the streaming media content via the MBMS client according to the merged MPD; and performing playback at the UE using the selected targeted media content stored in the cache at the UE and the streaming media content.

In one example, the targeted media content includes advertisements. In another example, the group ID elements associated with the user in the user profile relate to one of: viewing habits of the user or demographical information that describes the user. In yet another example, the method can include receiving the selected targeted media and the streaming media content from a broadcast multicast service center (BMSC).

In one configuration, the files or sessions corresponding to the targeted media content include dynamic adaptive streaming over hypertext transfer protocol (DASH)-formatted files or sessions. In another configuration, the method can include receiving the first metadata from an advertisement server via MBMS. In yet another configuration, the first metadata received from the server is included in an MBMS user service description (USD) that describes the targeted media content and the group ID elements that are associated with the targeted media content files.

Figure 10:
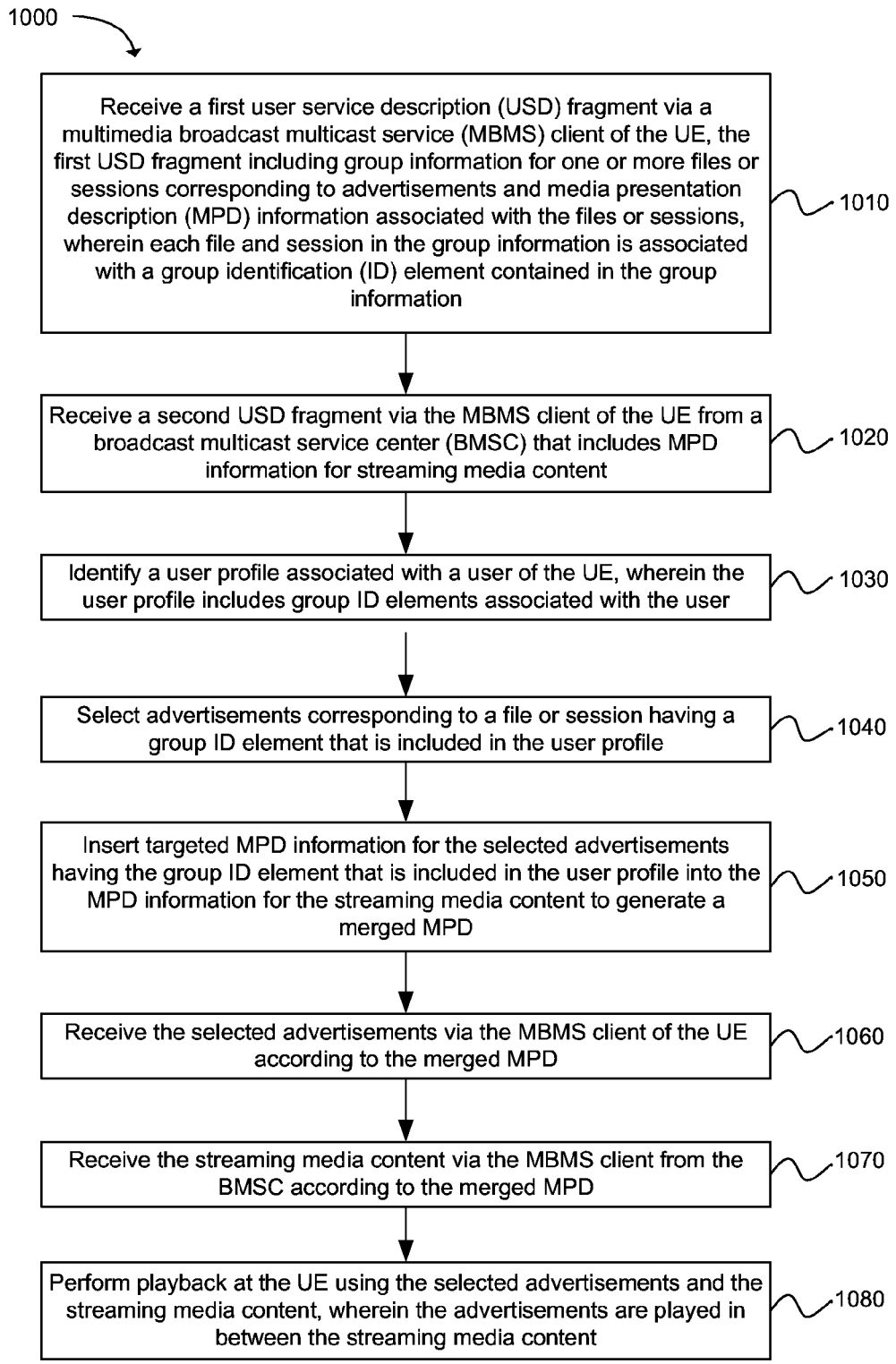
FIG. 10 depicts functionality of circuitry of a user equipment (UE) operable to support media content streaming.

Another example provides functionality 1000 of circuitry of a user equipment (UE) operable to support media content streaming, as shown in the flow chart in FIG. 10. The functionality can be implemented as a method or the functionality can be executed as instructions on a machine, where the instructions are included on at least one computer readable medium or one non-transitory machine readable storage medium. The circuitry can be configured to receive a first user service description (USD) fragment via a multimedia broadcast multicast service (MBMS) client of the UE, the first USD fragment including group information for one or more files or sessions corresponding to advertisements and media presentation description (MPD) information associated with the files or sessions, wherein each file and session in the group information is associated with a group identification (ID) element contained in the group information, as in block 1010. The circuitry can be configured to receive a second USD fragment via the MBMS client of the UE from a broadcast multicast service center (BMSC) that includes MPD information for streaming media content, as in block 1020. The circuitry can be configured to identify a user profile associated with a user of the UE, wherein the user profile includes group ID elements associated with the user, as in block 1030. The circuitry can be configured to select advertisements corresponding to a file or session having a group ID element that is included in the user profile, as in block 1040. The circuitry can be configured to insert targeted MPD information for the selected advertisements having the group ID element that is included in the user profile into the MPD information for the streaming media content to generate a merged MPD, as in block 1050. The circuitry can be configured to receive the selected advertisements via the MBMS client of the UE according to the merged MPD, as in block 1060. The circuitry can be configured to receive the streaming media content via the MBMS client from the BMSC according to the merged MPD, as in block 1070. In addition, the circuitry can be configured to perform playback at the UE using the selected advertisements and the streaming media content, wherein the advertisements are played in between the streaming media content, as in block 1080.

In one example, the files or sessions corresponding to the advertisements include dynamic adaptive streaming over hypertext transfer protocol (DASH)-formatted files or sessions. In another example, the circuitry can be further configured to: store the selected advertisements received via the MBMS client in a cache at the UE; and perform playback at the UE using the selected advertisements stored in the cache at the UE. In yet another example, the playback occurs at a dynamic adaptive streaming over hypertext transfer protocol (DASH) client of the UE.

Figure 11:
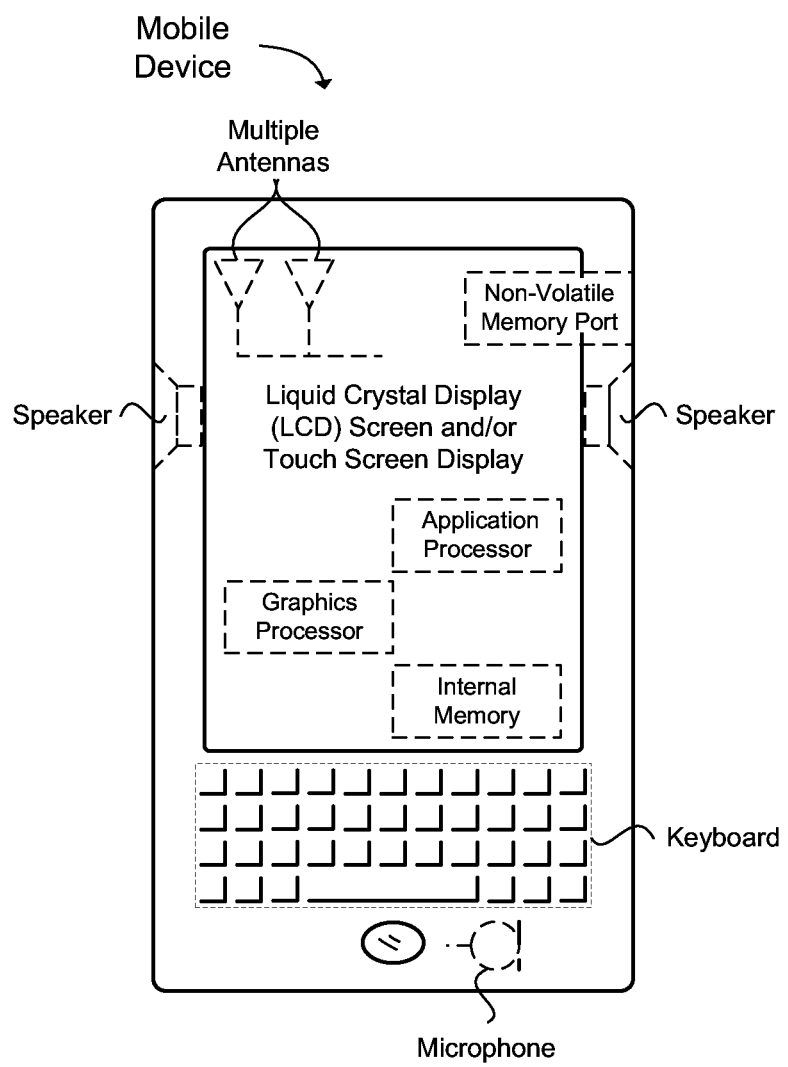
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) operable to receive targeted media content, the apparatus comprising one or more processors configured to:

receive, from a server, a first metadata via a multimedia broadcast multicast service (MBMS) client included in the UE, the first metadata including a group filter element having group information for one or more files or sessions corresponding to targeted media content and media presentation description (MPD) information associated with the files or sessions, wherein each file and session in the group filter element is associated with a group identification (groupID) element contained in the group filter element;

receive a second metadata in a user service description (USD) via MBMS that includes MPD information for streaming media content;

identify a user profile associated with a user of the UE, wherein the user profile includes groupID elements associated with the user;

map targeted media content in a file or session having a groupID element that is a groupID element included in the user profile, wherein the groupID elements associated with the user in the user profile relate to: viewing habits of the user and demographical information that describes the user; and insert MPD information for the mapped targeted media content having the groupID element that is included in the user profile into the MPD information for the streaming media content to generate a unified MPD to enable the UE to playback the mapped targeted media content with the streaming media content.

2. The apparatus of claim 1, wherein the one or more processors are further configured to receive the mapped targeted media content via the MBMS client according to the unified MPD.

3. The apparatus of claim 1, wherein the one or more processors are further configured to receive the streaming media content via the MBMS client according to the unified MPD.

4. The apparatus of claim 1, wherein the one or more processors are further configured to receive the mapped targeted media content and the streaming media content from a broadcast multicast service center (BMSC).

5. The apparatus of claim 1, wherein the first metadata received from the server is included in an MBMS user service description (USD) that describes the targeted media content and the groupID elements that are associated with the targeted media content files.

6. The apparatus of claim 1, wherein the playback occurs at a dynamic adaptive streaming over hypertext transfer protocol (DASH) client of the UE.

7. The apparatus of claim 1, wherein the UE includes an antenna, a touch sensitive display screen, a speaker, a microphone, a graphics processor, an application processor, internal memory, or a non-volatile memory port.

8. At least one non-transitory machine readable storage medium having instructions embodied thereon for receiving targeted media content at a user equipment (UE), the instructions when executed perform the following:
receiving, using at least one processor of the UE, a first metadata from a server via a multimedia broadcast multicast service (MBMS) client in a user equipment (UE), the first metadata including a group filter element having group information for one or more files or sessions corresponding to targeted media content and media presentation description (MPD) information associated with the files or sessions, wherein each file and session in the group filter element is associated with a group identification (groupID) element contained in the group filter element;
receiving a second metadata in a user service description (USD) via MBMS that includes MPD information for streaming media content;
identifying, using the at least one processor of the UE, a user profile associated with a user of the UE, wherein the user profile includes groupID elements associated with the user;
mapping, using the at least one processor of the UE, targeted media content in a file or session having a groupID element that is a groupID element included in the user profile, wherein the groupID elements associated with the user in the user profile relate to: viewing habits of the user and demographical information that describes the user;
inserting MPD information for the mapped targeted media content having the groupID element that is included in the user profile into the MPD information for the streaming media content to generate a unified MPD
receiving, using the at least one processor of the UE, the mapped targeted media content via the MBMS client in the UE;
receiving the streaming media content via the MBMS client according to the unified MPD; and
performing playback at the UE using the mapped targeted media content and the streaming media content.

9. The at least one non-transitory machine readable storage medium of claim 8, further comprising instructions which when executed by the at least one processor of the UE performs the following:
storing, using the at least one processor of the UE, the mapped targeted media content in a cache at the UE.

10. The at least one non-transitory machine readable storage medium of claim 8, further comprising instructions which when executed by the at least one processor of the UE performs the following: receiving the mapped targeted media and the streaming media content from a broadcast multicast service center (BMSC).

11. The at least one non-transitory machine readable storage medium of claim 8, wherein the files or sessions corresponding to the targeted media content include dynamic adaptive streaming over hypertext transfer protocol (DASH)-formatted files or sessions.

12. The at least one non-transitory machine readable storage medium of claim 8, wherein the first metadata received from the server is included in an MBMS user service description (USD) that describes the targeted media content and the groupID elements that are associated with the targeted media content files.

13. The at least one non-transitory machine readable storage medium of claim 8, wherein the targeted media content includes advertisements.

14. A user equipment (UE) including a multimedia broadcast multicast service (MBMS) client operable to receive targeted media content, the UE comprising one or more processors executing instructions on a non-transitory machine readable storage medium of the UE, the one or more processors configured to:
receive a first metadata from a server via MBMS, the first metadata including a group filter element having group information for one or more files or sessions corresponding to targeted media content and media presentation description (MPD) information associated with the files or sessions, wherein each file and session in the group filter element is associated with a group identification (groupID) element contained in the group filter element;
receive a second metadata in a user service description (USD) via MBMS that includes MPD information for streaming media content;
identify a user profile associated with a user of the UE, wherein the user profile includes groupID elements associated with the user;
map, at the second processor, targeted media content in a file or session having a groupID element that is a groupID element included in the user profile, wherein the groupID elements associated with the user in the user profile relate to: viewing habits of the user and demographical information that describes the user;
insert MPD information for the mapped targeted media content having the groupID element that is included in the user profile into the MPD information for the streaming media content to generate a unified MPD;
receive, at the first processor, the mapped targeted media content via the MBMS client according to the unified MPD;
receive the streaming media content via the MBMS client according to the unified MPD; and
perform playback at the UE using the mapped targeted media content and the streaming media content.

15. The UE of claim 14, wherein the one or more processors are further configured to:

store the mapped targeted media content received via the MBMS client in a cache at the UE; and perform playback of the mapped targeted media content that is stored in the cache at the UE.

16. The UE of claim 14, wherein the files or sessions correspond to advertisements.

17. The UE of claim 14, wherein the playback occurs at a dynamic adaptive streaming over hypertext transfer protocol (DASH) client of the UE.

18. A network element operable to communicate targeted media content to a multimedia broadcast multicast service (MBMS) client of a user equipment (UE), the network element comprising one or more processors executing instructions on a non-transitory machine readable storage medium of the network element, the one or more processors configured to:

send, at a first processor, a first metadata to the MBMS client of the UE, the first metadata including a group filter element having group information for one or more files or sessions corresponding to targeted media content and media presentation description (MPD) information associated with the files or sessions, wherein each file and session in the group filter element is associated with a group identification (groupID) element contained in the group filter element; and send, at the first processor, a second metadata in a user service description (USD) to the MBMS client of the UE that includes MPD information for streaming media content, wherein the UE is configured to:

identify a user profile associated with a user of the UE, wherein the user profile includes groupID elements associated with the user;

map targeted media content in a file or session having a groupID element that is a groupID element included in the user profile, wherein the groupID elements associated with the user in the user profile relate to: viewing habits of the user and demographical information that describes the user; and insert MPD information for the mapped targeted media content having the groupID element that is included in the user profile into the MPD information for the streaming media content to generate a unified MPD to enable the UE to playback the mapped targeted media content with the streaming media content.

19. The network element of claim 18, wherein the one or more processors are further configured to send the mapped targeted media content to the MBMS client of the UE.

20. The network element of claim 18, wherein the one or more processors are further configured to send the streaming media content to the MBMS client of the UE.

* * * * *